Nov. 15, 1938.　　　A. G. SAUER　　　2,136,469

CONTROL SYSTEM FOR ELECTRIC DEHYDRATORS

Filed Dec. 17, 1934

INVENTOR:
ARTHUR G. SAUER
By
Floyd W. Harris
ATTORNEY.

Patented Nov. 15, 1938

2,136,469

UNITED STATES PATENT OFFICE 2,136,469

CONTROL SYSTEM FOR ELECTRIC DEHYDRATORS

Arthur G. Sauer, Long Beach, Calif., assignor to Petroleum Rectifying Company of California, Los Angeles, Calif., a corporation of California Application December 17, 1934, Serial No. 757,909

18 Claims. (Cl. 204—24)

My invention relates to a novel control system for electric dehydrators, or for other equipment.

It is well-known that crude oil emulsions, or other emulsions in which water is the dispersed phase, can be electrically dehydrated by subjection to the action of a high intensity electric field. This field coalesces the dispersed water droplets into masses of sufficient size to readily separate from the material forming the continuous phase. In commercial treaters, both coalescing and separation take place in the same tank.

In such commercial treaters a system is sometimes provided for de-energizing the electrode should the liquid-level in the tank drop, thus overcoming fire and explosion hazards. Such a system also operates to prevent energization of the electrodes until the tank is completely filled. If such a treater is used in a flow-line system to treat the emulsion as fast as it is produced from the well, certain difficulties are encountered. The flow from such a well is not uniform, and it is well known that such a well often "heads", the supply of emulsion being stopped for a period of several minutes or more. So also, when a gas-trap is used ahead of the dehydrator, the supply of emulsion to the field is not uniform. In many instances such gas-traps will supply emulsion only intermittently.

In existing treaters elimination of the incoming emulsion flow followed by a subsequent renewal of this flow is very disadvantageous. Water continues to be withdrawn from the bottom of the tank through the conventional water draw-off, with the result that the contents of the treater tank are bled down considerably. The elecrodes have, at this time, been de-energized, and when a new supply of emulsion reaches the treater tank the liquid level therein must build up until the tank is completely filled before the electrodes are again energized. This results in the introduction into the upper end of the tank of a large quantity of untreated emulsion. Experience often shows that when the electrodes are again energized effective treatment cannot take place because of the presence of the large amount of untreated emulsion. In many treaters it is necessary to maintain at least a portion of the electric field filled with a dielectric liquid, usually a dry oil which has already been separated in the treater. However, under the conditions outlined above, the field will be entirely filled with untreated emulsion, thus preventing building up of the voltage on the electrodes.

It is an object of the present invention to provide a control system in which the means responsive to the total quantity of liquid in the tank is correlated with a means controlling the water drawn from the lower end of the tank.

It is a further object of the present invention to provide a control system which prevents any large drop of the oil level in the tank, so that no material portion of the tank is filled with raw emulsion when this emulsion is supplied to the dehydrator following a period in which no emulsion was thus supplied.

In the preferred embodiment of the invention I use in conjunction with the usual control for de-energizing the electrodes from drop in the oil level, an auxiliary control which operates ahead of the conventional control and which controls the water draw-off system, and it is an object of the present invention to provide such a system.

It is a further object of the present invention to utilize in connection with two such controls a third control tending to automatically retain in constant position the level of the body of water in the lower portion of the tank.

It is a further object of the invention to utilize a control system tending to maintain the water level constant, in conjunction with a control means responsive to the level of the oil in the upper end of the tank.

A further object of the present invention is to provide constituent control means of novel construction and correlated in a novel manner.

Another object of the present invention is to provide a novel water-level control which, if desired, can be used independently of the other control equipment to maintain the water level in a tank substantially constant in position.

Other objects of the present invention include a novel method of operating a dehydrator or other structure, certain of the steps in this method being novel, as well as the sequence of these steps.

Still further objects and advantages of the present invention will be evident to those skilled in the art from the following description of my invention with reference to an electrical dehydrator for treating crude oil emulsions. This embodiment has been selected for illustrative purposes only, and it should not be understood that the features of the present invention are limited thereto.

Referring to the drawing in which one embodiment of the invention is disclosed:

Figure 1:
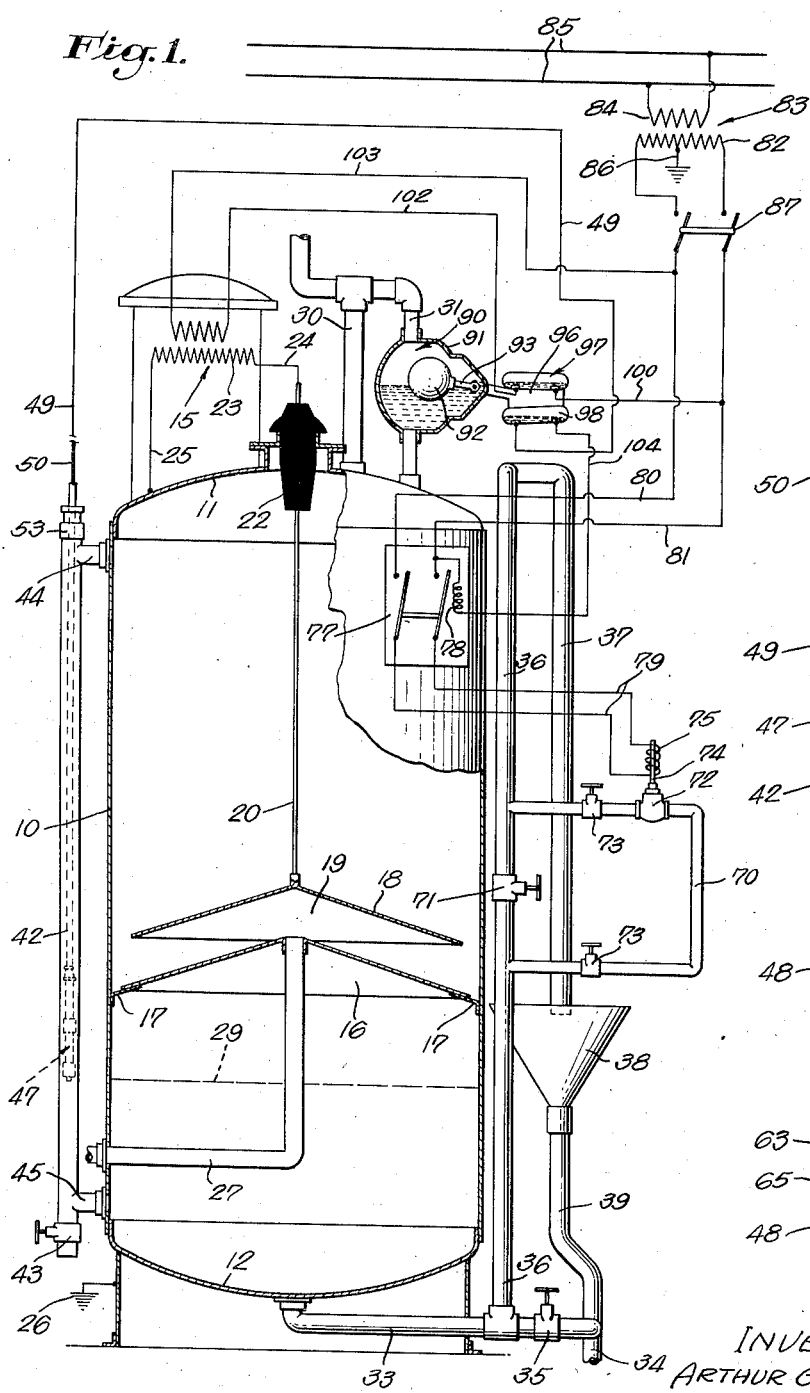
Fig. 1 is a vertical sectional view of a dehydrator incorporating the features of the present invention and showing the method in which the constituent parts are electrically connected together.

In Fig. 1, I have illustrated the invention as applied to an electric dehydrator receiving and treating an oil-water emulsion, though it will be clear that the novel control system herein shown can be used in conjunction with other types of electric treaters.

Referring to Fig. 1 the dehydrator therein shown includes the customary tank 10 closed at its upper end by a top wall 11 and at its lower end by a bottom wall 12. A means is provided for establishing an electric field in this tank. Usually such a means includes a potential supply means such as a transformer 15 together with an electrode means of suitable form.

In the embodiment shown this electrode means includes a lower conical electrode 16 spaced from the tank by any suitable means such as brackets 17. It also includes a live upper electrode 18 cooperating with the lower electrode in defining a treating space 19. A support 20 for the live electrode 18 extends upward and through the top wall 11, being insulated therefrom by a bushing 22. One terminal of a secondary winding 23 of the transformer 15 is connected by a conductor 24 to the support 20 and thus to the live electrode 18. The other terminal of this secondary winding is grounded to the tank through a conductor 25, the tank being in turn grounded as indicated by the numeral 26. This electrode means and potential supply means may be of any suitable form, the embodiment shown being for illustrative purposes only.

After an electric field has been established in the treating space 19, the emulsion or other liquid to be treated is introduced thereinto through a pipe 27. After the treater has been in operation for a period of time the dispersed particles of the emulsion, usually water, will drop to the lower end of the tank 10 and will form a body of water the surface of which is indicated by the dotted line 29, this surface being hereinafter termed a water level. The lighter phase liquid, usually oil, rises to the upper end of the tank 11 and will form a body of oil therein.

A suitable draw-off means is provided for withdrawing liquid from the interior of the tank 10. In the embodiment shown, oil can be simultaneously withdrawn through a pipe 30 and a by-pass pipe 31. Water can be withdrawn from the bottom of the tank through a pipe 33 and may move directly to a drain pipe 34 through a valve 35 if this valve is open. Usually, however, this valve is closed and the water flowing through the pipe 33 rises in a stand-pipe 36 to a level at or near the upper end of the tank 10 whence it flows downward to a pipe 37 and is discharged into a funnel 38 and moves through a pipe 39 to the drain 34.

In the preferred embodiment of the invention a means is provided which is responsive to the position of the water level 29, and which preferably acts to maintain this water level in substantially constant position. This means may include a side pipe 42 providing a normally closed valve 43 at its lower end to permit periodic drainage thereof, if desired. The upper end of the pipe 42 communicates with the oil in the upper end of the tank 10 through a pipe 44, while the lower end of the side pipe 42 communicates with the body of water in the bottom of the tank 10 through a pipe 45. This side pipe will thus contain auxiliary bodies of oil and water, the water level being at substantially the same level as the water level 29 in the tank 10. The interior of the tank 10, or the interior of this tank in conjunction with the side pipe 42 and the pipe 31, defines a chamber, the oil level being in the upper end of this chamber and the water level being in an intermediate portion thereof.

Figure 2:
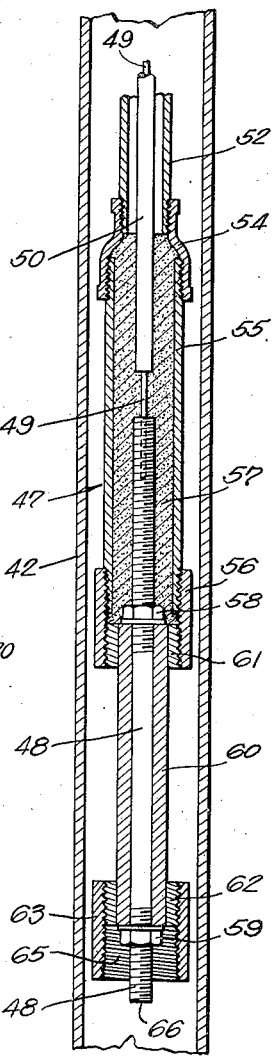
Fig. 2 is an enlarged sectional view of the electrode system used to control the water level in the treater shown in Fig. 1.

Extending downward in the side pipe 42 and terminating at the desired water level therein is an electrode structure 47 which is preferably, though not invariably, adjustable in vertical position. As best shown in Fig. 2. this electrode structure includes an electrode 48 which may be in the form of a threaded rod. A conductor 49 of an insulated wire 50 may extend downward into a cavity at the upper end of this threaded rod. A conduit 52 extends downward around the wire 50 to protect this wire and support the electrode structure. This conduit may extend through a stuffing box 53 at the upper end of the side pipe 42 so as to be adjustable in vertical position, thus adjusting the vertical position of the electrode 48. A reducer 54 depends from the conduit 52 and carries a nipple 55 which in turn carries a coupling 56. Battery compound 57, or other insulating media, may be used to fill the space inside the nipple 55, as shown. Nuts 58 and 59 are threaded to the electrode 48 and clamp in place a tube of insulating material 60 which surrounds this electrode. The space between this insulating material and the coupling 56 is filled by a conduit bushing 61. A similar conduit bushing is carried at the lower end of the tube 60 and is indicated by the numeral 62, this conduit bushing being threaded into a coupling 63 which depends downward around the nut 59 to provide a gas pocket 65. Any gas which accumulates in this pocket thus serves to protect the system from short-circuiting by preventing water from rising in the gas chamber. The lower end of the electrode 48 preferably terminates a short distance below the bottom of the bushing 63, this lower end being indicated by the numeral 66. A potential difference can be maintained between the electrode 48 and the water in the lower end of the side pipe 42 in a manner to be hereinafter described. Thus, when the water contacts the lower end 66 of the electrode a circuit is completed which can be used to control the draw-off means previously described.

While it is possible to control the draw-off of both oil and water, in the preferred embodiment of the invention only the latter system is utilized. As shown in Fig. 1, this system includes a pipe 70 by-passing a throttling valve 71 in the stand-pipe 36. If this valve is closed down, more or all of the rising water will move through the pipe 70, the flow therethrough being controlled by a suitably magnetically operated valve 72, or any other remotely controlled valve. Valves 73 may be used to control the maximum flow through the pipe 70 when the valve 72 is open.

Such magnetic valves 72 are well-known in the art and need not be described in detail. The embodiment diagrammatically shown includes a plunger 74 which is raised when a control winding 75 is energized. This valve may be of such a type as to move from open to closed position when the control winding 75 is energized and de-energized, or the valve can be so adjusted that when the control winding 75 is de-energized the valve will still be slightly open.

A suitable circuit means can be utilized for interconnecting the control winding 75 of the magnetic valve and the electrode structure 47. In the embodiment shown a magnetic switch 77 including a control winding 78 is used for controlling the operation of the magnetic valve 72, being connected thereto by conductors 79. When the control winding 78 is energized, the switch closes and the current flows through conductors 80 and 81 connected to end terminals of a secondary winding 82 of a master transformer 83. This transformer includes a primary winding 84 connected to a line 85. The secondary winding 82 is preferably center-tapped and is grounded as indicated at 86. A main switch 87 preferably controls the current flowing through the conductors 80 and 81, as well as the current to the remainder of the control system.

It is preferable to correlate the water-level control with a control which is responsive to the amount of liquid in the tank 10. In this connection disastrous results might accrue if the oil level dropped to such a position that the upper end of the tank 10 contained a mixture of air and gas. In the embodiment shown, this correlation is effected through a control means responsive to the position of the oil level. As shown, the pipe 31 communicates with an enlarged chamber 90 formed by an enclosing structure 91. A level-responsive means may be positioned in the enlarged chamber 90 and is shown as comprising a float 92 secured to a staggered arm 93 which extends sideward through the enclosing structure 91, being sealed and journalled in a stuffing box in the usual manner.

The float 92, or other level-responsive means, may be used to control the energization of the electrodes, or to control the water-level control system. In the preferred embodiment of the invention it can be used to control both of these functions. In the embodiment shown, this is accomplished by the use of a suitable switch means operatively associated with the level-responsive means such as the float 92. Thus, the rear end of the staggered arm 93 carries a member 96 to which is secured a first control switch 97 and a second control switch 98. These control switches may be formed in any one of a number of ways. The embodiments illustrated are of the mercury contact type including a glass tube in which is sealed two spaced electrodes bridged by a body of mercury or other conducting liquid when the tube is in a substantially horizontal position, thus closing the circuit between these electrodes, this circuit being opened when the tube is inclined sufficiently to move the mercury into one end of the tube and out of bridging relationship with the electrodes. The second control switch 98 is preferably set to break the circuit therethrough prior to the time that the circuit through the first control switch 97 is broken should the oil level in the enlarged chamber 90 drop below the level indicated in Fig. 1. When the level is as shown, or when the level is above the position shown, or when the enlarged chamber is entirely filled with oil, the control switches 97 and 98 will be closed as indicated in Fig. 1. When, however, the float 92 lowers slightly from its position shown, due to a drop in the oil level in the enlarged chamber 90, the control switch 98 first opens, and thereafter the control switch 97 opens. This may be accomplished by mounting the switches on the member 96 so that they are slightly out of parallelism, as shown.

The first control switch 97 may be used to control the energization of the electrode. Thus, in the circuit shown, one terminal of this first control switch 97 is connected by a conductor 100 to the conductor 81 so that when this switch is closed current may flow through a conductor 102, thence through the primary of the main transformer 15, returning to the conductor 80 through a conductor 103.

The second control switch 98 may be used to control the draw-off means. As shown, the conductor 49 associated with the electrode structure 47 is connected to one electrode or terminal of the second control switch 98, the other terminal being connected by a conductor 104 to the control winding 78 of the magnetic switch 77, the remaining terminal of this control winding being connected to the conductor 81 as shown.

The operation of the treater can be best understood by segregating the function of the different control means and considering the action which takes place when one or more of these control means are in operation. For purpose of illustration, let it be assumed that the treater has been in operation for a period of time so that the bodies of oil and water have formed therein as previously described. If this treater is directly connected to a well, or directly connected to a gas trap, the emulsion flow reaching the treater may be intermittent. Thus, if the well "heads", the incoming flow of emulsion may be entirely cut off for a period of time which may, in some instances, be as long as twenty or thirty minutes.

The action which takes place during this time can best be understood by considering that the treater is not equipped with any water-level control means. During such a period in which no incoming emulsion is supplied to the field, water will continue to be withdrawn through the draw-off means at a predetermined rate. This will drain down the liquid constituents in the tank 10 and will lower the oil level in the enlarged chamber 90 so that the first control switch 97 is opened, thus de-energizing the electrodes. This eliminates fire hazard should the oil level continue to drop. It will be clear, however, that the liquid constituents in the tank 10 may continue to drain to a level determined by the lower end of the depending pipe 37. If, then, the well or gas trap again supplies emulsion to the pipe 27, the treating space 19 will be completely filled with untreated emulsion, and this untreated emulsion will continue to rise in the tank 10 until the surface thereof raises the float 92 sufficiently to close the first control switch 97. At this time the transformer is energized, but the difficulty is that the entire upper end of the tank has been filled with untreated emulsion, as well as the treating space 19, so that it is impossible for the transformer 15 to build voltage. As no electric field can thus be established, it is necessary for the operator to drain the tank 10, after shutting down the treater, and thereafter fill the upper end of the tank 10 with a body of already treated oil.

If, however, a means is used for partially or wholly closing the draw-off means, and if this means is correlated with the means responsive to the oil level, this detrimental action will be eliminated. Thus, with the complete system shown, let us assume that the water level 29 is slightly high, and that the valve 72 is thus opened. This condition will exist due to current flowing from the right-hand half of the secondary winding 82 of the master transformer 83, through the conductor 81, the control winding 78 of the magnetic switch 77, the conductor 104, the second control switch 98, and the conductor 49, the current then flowing from the electrode 48 to the water in the side pipe 42, and returning to the secondary winding 82 through ground. If, at this time, the flow of incoming emulsion is decreased or entirely eliminated, water may continue to drain from the tank 10 through the open valve 72, and the oil level in the enlarged chamber 90 may drop slightly below the position indicated. The first action which occurs is the opening of the second control switch 98, thus breaking the circuit through the control winding 78 of the magnetic switch 77 and thus opening this switch to close the valve 72. If this valve closes completely, and if the liquid constituents do not contract due to cooling thereof, nothing further will happen, and the oil level will not continue to lower. Thus, when the emulsion supply is again established, the electrodes are still energized, and treatment can continue in the usual way. During the period that no emulsion has been supplied, the electric field has continued to treat the constituents already in the tank 10.

If, however, the valve 72 has not completely closed, or if the temperature in the tank drops to permit contraction of the liquid constituents therein, the oil level in the enlarged chamber 90 may further drop. It is very desirable that this level should not drop to such an extent that the upper end of the tank 10 would contain air or other gas during the time that the electrodes are energized. With the system shown in Fig. 1 such a further drop in the oil level will open the first control switch 97 and thus de-energize the transformer 15 prior to the time that the oil level could drop to such an extent as to permit entry of gas or air into the upper end of the tank 10.

Thus, with the system shown, elimination of the incoming emulsion flow will not excessively drain the constituents from the tank 10, and will maintain the electrodes energized. Further, these electrodes will only be de-energized if under adverse conditions, the oil level drops to a dangerous point.

It will be clear that several of the control features of the present application can be used independently or collectively without including all of the control means disclosed in Fig. 1. Thus, if a valve 72 is used which completely closes, it is often possible to dispense with the first control switch 97 due to the fact that the oil level will not continue to drop, except under adverse conditions not often met.

So also, the water-level control system shown can be used independently of the other control equipment illustrated in Fig. 1. Thus, the second control switch 98 can be eliminated, the conductors 49 and 104 being directly connected together. Such a system will maintain the water level 29 substantially in the position indicated. When this level rises, the circuit previously described will be closed and the magnetic switch will be closed to open the valve 72. This will lower the water level 29 until the water no longer contacts the lower end 66 of the electrode 48 at which time the valve 72 will close.

It will thus be clear that several of the features of the present invention are novel. For example, I believe it to be new to correlate the actuation of the draw-off means and a means responsive to the total amount of liquid constituents in the treater tank. So also, I believe it to be novel to operate such a draw-off means ahead of the means controlling the energization of the electrode. The switching arrangement shown is also believed to be novel. So also, the water-level control means including a magnetic switch or similar means for operating a control valve in the draw-off means is believed to be novel. In this connection it will also be noted that the form of the invention shown in Fig. 1 applies to the water-level control system a potential which is substantially one-half of the potential developed in the secondary winding of the master transformer 83. This feature of using a decreased voltage between the electrode 48 and the water level in the side pipe 42 is believed to be novel. So also, the by-passing relationship between the pipe 70 and the valve 71 is novel and is of particular advantage in water-level control systems such as shown.

Various other features of the invention are also believed to be novel, including the by-pass pipe 31 in conjunction with the pipe 30 and including the features of construction of certain of the apparatus. Finally, the method of operating an electric treater as herein disclosed, is believed to be new.

Thus, while I have disclosed a particular embodiment of the invention, it should be understood that I am not limited thereto, this embodiment being for illustrative purposes, and not being disclosed for the purpose of limiting myself thereto, or to the complete series of elements disclosed therein. I therefore desire that the appended claims be construed as broadly as possible in view of the prior art.

I claim as my invention:

1. In a control system for an electric treater including a tank providing a liquid-containing chamber, the combination of: means for establishing an electric field in said tank; means responsive to the total quantity of liquid in said chamber and associated with said means for establishing said electric field to control the same in response to the quantity of liquid in said chamber; draw-off means through which liquid may be withdrawn from said chamber; control means associated with said draw-off means and including a valve means for controlling the flow therethrough; and means operatively connecting said valve means and said means responsive to the quantity of liquid in said tank whereby the flow through said valve means is controlled by said means responsive to the quantity of said liquid in said chamber, said responsive means controlling said establishing means and said control means to discontinue said field when said quantity of liquid becomes less than a predetermined amount and to close said valve means before said field is discontinued.

2. In a control system for an electric treater including a tank providing a liquid-containing chamber, the combination of: electrode means in said tank; potential-supply means for energizing said electrodes; switch means controlling the energization of said electrode means; control means associated with said switch means for de-energizing said electrode means in response to the total quantity of liquid in said chamber; draw-off means through which liquid may be withdrawn from said chamber; and means associated with said draw-off means and with said control means for preventing excessive drainage through said draw-off means when said control means actuates said switch means to deenergize said electrodes.

3. A combination as defined in claim 1 in which said chamber contains a body of oil in its upper end and a body of water in its lower end and in which said means responsive to the quantity of said liquid in said chamber comprises a float which drops when the surface of said body of oil drops, and in which said draw-off means communicates with said body of water to draw water from said chamber.

4. In a control system for an electric treater including a tank providing a chamber containing a body of water in its lower end and a body of oil in its upper end, the combination of: means for establishing an electric field in said tank; means for supplying to said tank an oil-water emulsion to be treated, said electric field treating said emulsion so that said oil and water separate and move into their respective bodies; level-control means for maintaining the water level in said chamber substantially constant during normal operation; and means responsive to the level of the upper surface of said body of oil for rendering ineffective said level-control means when the level of said surface of said oil drops below a predetermined level.

5. A combination as defined in claim 4 in which said means for establishing said electric field includes a potential-supply means and an electrode means, and in which said means responsive to the oil level includes a switch means controlling the energization of said electrode means, and in which said means responsive to the oil level provides means for rendering ineffective said level-control means ahead of the time that actuation of said switch means takes place.

6. In a control system for an electric treater including a tank providing a chamber containing a body of water in its lower end and a body of oil in its upper end, the combination of: means for establishing an electric field in said tank; means for supplying to said tank an oil-water emulsion to be treated, said electric field treating said emulsion so that said oil and water separate and move into their respective bodies; water draw-off means for removing water from the bottom of said chamber; a valve controlling the rate of flow through said water draw-off means; and means responsive to the upper surface level of said body of oil in the upper end of said chamber for controlling the opening and closing movements of said valve.

7. A combination as defined in claim 6 in which said last-named means includes means for first closing said valve and then eliminating said field should the oil level continue to drop.

8. In a control system for an electric treater including a tank providing a chamber containing a body of oil in its upper end and a body of water in its lower end, the combination of: means for establishing an electric field in said tank; draw-off means for withdrawing water from the bottom of said chamber; a magnetic valve for controlling the flow through said draw-off means and providing a winding; switch means controlling the energization of said winding and including a control winding controlling the closing of said switch means; a control switch opening and closing in response to the position of the upper surface level of said body of oil in the upper end of said chamber; and circuit means connecting said control switch and said control winding of said switch means.

9. In a control system for an electric treater including a tank providing a chamber containing a body of oil in its upper end and a body of water in its lower end, the combination of: electrode means in said tank; potential-supply means for energizing said electrode means; a first switch means controlling the energization of said electrode means; level-responsive means responsive to the oil level in the upper end of said chamber and operatively connected to said first switch means; draw-off means for withdrawing water from the lower end of said chamber; a magnetic valve controlling the flow through said draw-off means; a second switch means operatively connected to said level-responsive means, said second switch means being operatively connected to said magnetic valve for controlling the same and set to operate ahead of said first switch means whereby said magnetic valve is actuated before said first switch affects said electric field.

10. In a control system for an electric treater including a tank providing a chamber containing a body of oil in its upper end and a body of water in its lower end, the combination of: electrode means in said tank; potential-supply means for energizing said electrode means; a first switch means controlling the energization of said electrode means; level-responsive means responsive to the oil level in the upper end of said chamber and operatively connected to said first switch means; draw-off means for withdrawing water from the lower end of said chamber; a magnetic valve controlling the flow through said draw-off means; a second switch means operatively connected to said level-responsive means; a magnetic switch including a control winding connected in series with said second switch whereby said second switch operates said magnetic switch; and circuit means connecting said magnetic valve and said magnetic switch to operate said magnetic valve when said magnetic switch is operated by said second switch.

11. In a control system for an electric treater including a tank providing a chamber containing a body of water in its lower end and a body of oil in its upper end, the combination of: electrode means for establishing an electric field in said tank; means for supplying to said tank an oil-water emulsion to be treated, said electric field treating said emulsion so that said oil and water separate and move into their respective bodies; draw-off means withdrawing water from the bottom of said chamber; magnetic valve means controlling the flow through said draw-off means and including a control winding; a magnetic switch controlling the energization of said winding; a control electrode spaced from said electrode means and contactable by said water when the water level rises; circuit means connecting said control electrode and said control winding of said magnetic switch; and switch means in said circuit and operating in response to the upper surface of the oil in said chamber.

12. In a control system for an electric treater for emulsions and including a tank providing a chamber, the combination of: means for continuously delivering emulsion to said tank in an amount which may vary during operation of the treater; electrode means for treating said emulsion in said tank to cause separation of the phase liquids; means for withdrawing liquid from said tank and including a valve means; means responsive to the total quantity of liquid in said tank for at least partially closing said valve means when the quantity of liquid in said tank decreases; and means responsive to the total quantity of liquid in said tank for deenergizing said electrode means upon further decrease in the quantity of liquid in said tank below a predetermined quantity due to interruption of said continuous delivery.

13. In combination in an electric treater for crude oil emulsions produced by a well: a treater tank providing a treating-separating chamber; electrode means in said tank for establishing an electric field therein of sufficient intensity to coalesce the dispersed water phase of said emulsion and permit same to settle in said treater tank to form a body of water in the lower end thereof and a body of oil in the upper end thereof; means delivering the emulsion produced by said well to said treater tank as fast as said emulsion is produced by said well whereby the non-uniform delivery of emulsion from said well causes corresponding variations in the emulsion delivered to said treater tank; draw-off means for withdrawing water from the lower end of said tank and thus tending to change the position of the water level therein if the emulsion production is non-uniform; valve means controlling the rate of flow through said draw-off means; walls defining a passage which is isolated from said electric field, said passage communicating openly at its upper and lower ends with said bodies of oil and water respectively whereby said passage contains oil and water separating at an interface which rises and falls in said passage with change in the relative amounts of water and oil in said treating-separating chamber; and means responsive to the position of said interface in said passage for controlling the opening and closing movements of said valve means to control the quantity of water withdrawn and thus control the position of said water level in said treating-separating chamber to maintain same substantially constant.

14. In combination in an electric treater for crude oil emulsions produced by a well: a treater tank providing a treating-separating chamber; electrode means in said tank for establishing an electric field therein of sufficient intensity to coalesce the dispersed water phase of said emulsion and permit same to settle in said treater tank to form a body of water in the lower end thereof and a body of oil in the upper end thereof; means delivering the emulsion produced by said well to said treater tank as fast as said emulsion is produced by said well whereby the non-uniform delivery of emulsion from said well causes corresponding variations in the emulsion delivered to said treater tank; draw-off means for withdrawing water from the lower end of said tank and thus tending to change the position of the water level therein if the emulsion production is non-uniform; valve means controlling the flow of water through said draw-off means; electric means for controlling said valve means; walls defining a passage communicating at its upper end with said oil in said treater tank and at its lower end with said water in said treater tank whereby said passage contains oil and water, the water level being substantially the same as the water level in said treating-separating chamber; an electrode extending in said passage to be contacted by water when the water level therein rises; and circuit means operatively connecting said electrode and said electric means to control the opening and closing movements of said valve in response to the position of the water level in said passage.

15. A combination as defined in claim 14 in which said circuit means includes means therein responsive to the position of said oil level and controlling the energization of said electric means.

16. In a control system for an electric treater including a tank providing a chamber containing a body of water in its lower end and a body of oil in its upper end, the combination of: means for establishing an electric field in said tank of sufficient intensity to coalesce the dispersed water phase of an oil-water emulsion so that the constituent phases respectively gravitate to said body of water and said body of oil; means for intermittently supplying said emulsion to said tank; draw-off means for withdrawing water from said body of water in the lower end of said tank; valve means in said draw-off means; means responsive to the water level and operatively connected to said valve means for controlling the opening and closing movements thereof; and means responsive to the level of the upper surface of said body of oil and operatively connected to said valve means to control the opening and closing of said valve means by said water level responsive means.

17. In a control system for an electric treater including a tank providing a chamber containing a body of water in its lower end and a body of oil in its upper end, the combination of: means for establishing an electric field in said tank; means for supplying to said tank an oil-water emulsion to be treated, said electric field treating said emulsion so that said oil and water separate and move into their respective bodies; a water draw-off pipe communicating with said body of water to draw water from said tank; valve means in said pipe; a by-pass pipe communicating with said water draw-off pipe at points ahead of and beyond said valve means; a control valve in said by-pass pipe; and means responsive to a rise and fall of the level of said body of water for controlling the opening and closing movements of said control valve.

18. A combination as defined in claim 17 in which said last-named means includes walls defining a passage openly communicating at its upper and lower ends with said bodies of oil and water in said tank whereby said passage contains oil and water separating at a water level which rises and falls in said passage with change in the relative amounts of water and oil in said bodies in said tank, and includes means for moving said control valve toward a closed position when said water level in said passage drops and toward an open position when said water level in said passage rises.

ARTHUR G. SAUER.